United States Patent [19]
Tohda et al.

[11] Patent Number: 5,468,959
[45] Date of Patent: Nov. 21, 1995

[54] SCANNING PROBE MICROSCOPE AND METHOD FOR MEASURING SURFACES BY USING THIS MICROSCOPE

[75] Inventors: Takao Tohda, Ikoma; Hiroyuki Kado, Osaka; Shinichi Yamamoto, Tsuchiura, all of Japan

[73] Assignee: Matsushita Electric Industrial Co., Ltd., Osaka, Japan

[21] Appl. No.: 210,397

[22] Filed: Mar. 18, 1994

[30] Foreign Application Priority Data

Mar. 19, 1993 [JP] Japan ............... 5-59863

[51] Int. Cl.⁶ ................... H01J 37/28
[52] U.S. Cl. .............. 250/306; 250/307; 250/423 F; 73/105
[58] Field of Search .................. 250/306, 307, 250/423 F; 73/105

[56] References Cited

U.S. PATENT DOCUMENTS

| | | | |
|---|---|---|---|
| 4,343,993 | 8/1982 | Binnig et al. | 250/306 |
| 4,724,318 | 2/1988 | Binnig | 250/306 |
| 5,187,367 | 2/1993 | Miyazaki et al. | 250/306 |
| 5,206,702 | 4/1993 | Kato et al. | 250/306 |
| 5,289,004 | 2/1994 | Okada et al. | 250/306 |
| 5,308,974 | 5/1994 | Elings et al. | 250/306 |
| 5,338,932 | 8/1994 | Theodore et al. | 250/306 |

FOREIGN PATENT DOCUMENTS

| | | |
|---|---|---|
| 0262253 | 4/1988 | European Pat. Off. |
| 0441311 | 8/1991 | European Pat. Off. |
| 0449221 | 10/1991 | European Pat. Off. |
| 0511763 | 11/1992 | European Pat. Off. |
| 0596494 | 5/1994 | European Pat. Off. |
| 3277903 | 12/1919 | Japan. |
| 5026662 | 2/1993 | Japan. |

OTHER PUBLICATIONS

Review of Scientific Instruments., vol. 63, No. 12, Dec. 1992, New York, US, pp. 5626–5633, A. M. Stewart; J. L. Parker 'Force Feedback Surface Force Apparatus : Principles of Operation'.

Applied Physics Letters., vol. 52, No. 26, 27 Jun. 1988, New York US, pp. 2233–2235, P. J. Bryant, R. G. Miller, R. Yang 'scanning tunneling microscope and atomic force microscopy combined'.

*Primary Examiner*—Jack I. Berman
*Assistant Examiner*—James Beyer
*Attorney, Agent, or Firm*—Lowe, Price, LeBlanc & Becker

[57] ABSTRACT

A microscope comprises a cantilever having a distal end equipped with an electrically conductive probe allowing current to flow and having a fine tip whose voltage is controllable, a position control mechanism for controlling position of a sample with respect to a base end of the cantilever, a small displacement measuring mechanism for measuring a deflection amount of the cantilever, and a deflection control mechanism for controlling deflection of the cantilever so as to adjust a distance between the fine tip of the probe and the sample. A method for measuring surfaces using this novel microscope comprises steps of: maintaining deflection of the cantilever at a constant value by using the small displacement measuring mechanism and the deflection control mechanism; applying a constant voltage between the electrically conductive probe and the sample; scanning the sample along surface of the sample with the probe, while a tunneling current is maintained at a constant value by using the position control mechanism; and measuring a control amount of the position control mechanism in a direction vertical to the sample and a control amount of the deflection control mechanism.

21 Claims, 3 Drawing Sheets

SCANNING PROBE MICROSCOPE AND METHOD FOR MEASURING SURFACES BY USING THIS MICROSCOPE

BACKGROUND OF THE INVENTION

1. Field of the Invention:

The present invention relates to a scanning probe microscope, and more particularly to an active cantilever equipped, scanning probe microscope with advanced functions combining the atomic force microscope (hereinafter abbreviated as AFM) and the scanning tunneling microscope (hereinafter abbreviated as STM) and to a method for measuring surfaces by using this novel microscope.

2. Prior Art

In early 1980s, STMs were developed as an apparatus allowing the observation of surfaces of solids with atomic-scale resolution. STMs utilize the phenomenon that a tunneling current flowing between an electrically conductive probe with a fine tip and the surface of a sample greatly depends on a distance between the probe and the surface of the sample. According to the STM measuring method, the probe scans the surface of the sample over its surface to observe the atomic arrangement while the tunneling current is maintained at a constant value. Furthermore, the measurement of electronic state density can be also executed by obtaining the voltage-current characteristics of the tunneling current.

Lately, some novel microscopes have been developed based on the principle of such a STM measurement.

Among them, AFMs are characterized by the detection of an attractive force or a repulsive force acting between the sample and the fine tip equipped probe, thereby enabling the measurement of roughness on the sample surface. In other words, the AFMs allow detailed observation, which was not achieved by the conventional STMs, on the surface structures of a wide range and a variety of materials, such as semiconductors, metals, organism and insulators.

However, these conventional STM and AFM, both a scanning probe microscope, have been encountered with the difficulty in identifying atomic species, in spite of the fact that they can assure the observation of atomic arrangement on the surface of metals, semiconductors, insulators, and the like. The AFM, if the probe is supported on a cantilever of a small spring constant to increase sensitivity in the vertical direction with respect to the sample, will encounter with another problem that, when the probe comes close to the sample, the cantilever is abruptly attracted toward the sample as soon as an attraction force acts between the sample and the probe. It means that the conventional AFM may not maintain the distance between the prove and the sample to cause a desired attracting force therebetween.

SUMMARY OF THE INVENTION

Accordingly, in view of above-described problems encountered in the prior art, an object of the present invention is to provide an active cantilever equipped, scanning probe microscope with advanced functions combining the AFM and STM so as to realize the AFM and STM measurements in the desired attracting force region by use of this novel microscope, and also to provide a highly advanced surface evaluating method utilized, for example, in the identification of atomic species.

In order to accomplish above purposes, a first aspect of the present invention provides a scanning probe microscope comprising: a cantilever having a distal end equipped with an electrically conductive probe, said electrically conductive prove allowing current to flow and having a fine tip whose voltage is controllable; a position control mechanism for controlling position of a sample with respect to a base end of said cantilever; a small displacement measuring mechanism for measuring a deflection amount of said cantilever; and a deflection control mechanism for controlling deflection of said cantilever so as to adjust a distance between said fine tip of said probe and said sample at a desirable value.

A second aspect of the present invention provides a scanning probe microscope comprising: a cantilever having a distal end equipped with an electrically conductive probe, said electrically conductive prove allowing current to flow and having a fine tip whose voltage is controllable; a position control mechanism for controlling position of a sample with respect to a base end of said cantilever; a small displacement measuring mechanism for measuring a deflection amount of said cantilever; a deflection control mechanism for controlling deflection of said cantilever so as to adjust a distance between said fine tip of said probe and said sample at a desirable value; and a switch for selectively supplying an output of said small displacement measuring mechanism to said position control mechanism or to said deflection control mechanism.

A third aspect of the present invention provides a method for measuring surfaces with above novel microscope, comprising steps of: maintaining deflection of said cantilever at a constant value by using said small displacement measuring mechanism and said deflection control mechanism; applying a constant voltage between said electrically conductive probe and said sample; scanning said sample along surface of said sample with said probe, while a tunneling current is maintained at a constant value by using said position control mechanism; and measuring a control amount of said position control mechanism in a direction vertical to said sample and a control amount of said deflection control mechanism.

A fourth aspect of the present invention provides a method for measuring surfaces with above novel microscope, comprising steps of: maintaining deflection of said cantilever at a constant value by using said small displacement measuring mechanism and said deflection control mechanism; applying a constant voltage between said electrically conductive probe and said sample to cause tunneling current; scanning said sample along surface of said sample with said probe, using said position control mechanism; and measuring an amount of said tunneling current and a control amount of said deflection control mechanism.

A fifth aspect of the present invention provides a method for measuring surfaces with above novel microscope, comprising steps of: maintaining deflection of said cantilever at a constant value by using said small displacement measuring mechanism and said position control mechanism, after controlling the deflection of said cantilever by said deflection control mechanism to optimize an output of said small displacement measuring mechanism; applying a constant voltage between said electrically conductive probe and said sample to cause current; scanning said sample along surface of said sample with said probe, using said position control mechanism; and measuring an amount of said current and a control amount of said position control mechanism.

A sixth aspect of the present invention provides a method for measuring surfaces with above novel microscope, comprising steps of: measuring a deflection amount of said cantilever by using said small displacement measuring mechanism, after controlling the deflection of said cantilever by said deflection control mechanism to optimize an output of said small displacement measuring mechanism; applying a constant voltage between said electrically conductive probe and said sample to cause current; scanning said sample along surface of said sample with said probe, using said position control mechanism; and measuring an amount of said current and deflection amount.

A seventh aspect of the present invention provides a method for measuring surfaces with above novel microscope, comprising steps of: bringing said probe and said sample into closer relationship under a condition where voltage is applied between said probe and said sample; maintaining a tunneling current flowing between said probe and said sample at a constant value by said deflection control mechanism; scanning said sample along surface of said sample with said probe, using said position control mechanism; and measuring a control amount of said deflection control mechanism and a deflection amount of said cantilever detected by said small displacement measuring mechanism.

Accordingly, the present invention provides an active cantilever equipped, novel scanning probe microscope with advanced functions combining the AFM and STM, wherein the deflection amount of the cantilever is controlled to a desired value without mechanically pushing the probe directly onto a sample. Thus, it enables various measurements, such as the dependency of the probe-material interactive force ranging from attracting forces to repulsive forces with respect to the probe-sample distance, and the voltage-tunneling current characteristics with respect to the probe-sample distance. Using these numerous information, it becomes possible to realize a highly advanced method for evaluating surface characteristics including identification of atom species.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Hereinafter, preferred embodiments of the present invention will be explained in detail with reference to the accompanying drawings.

Figure 1:
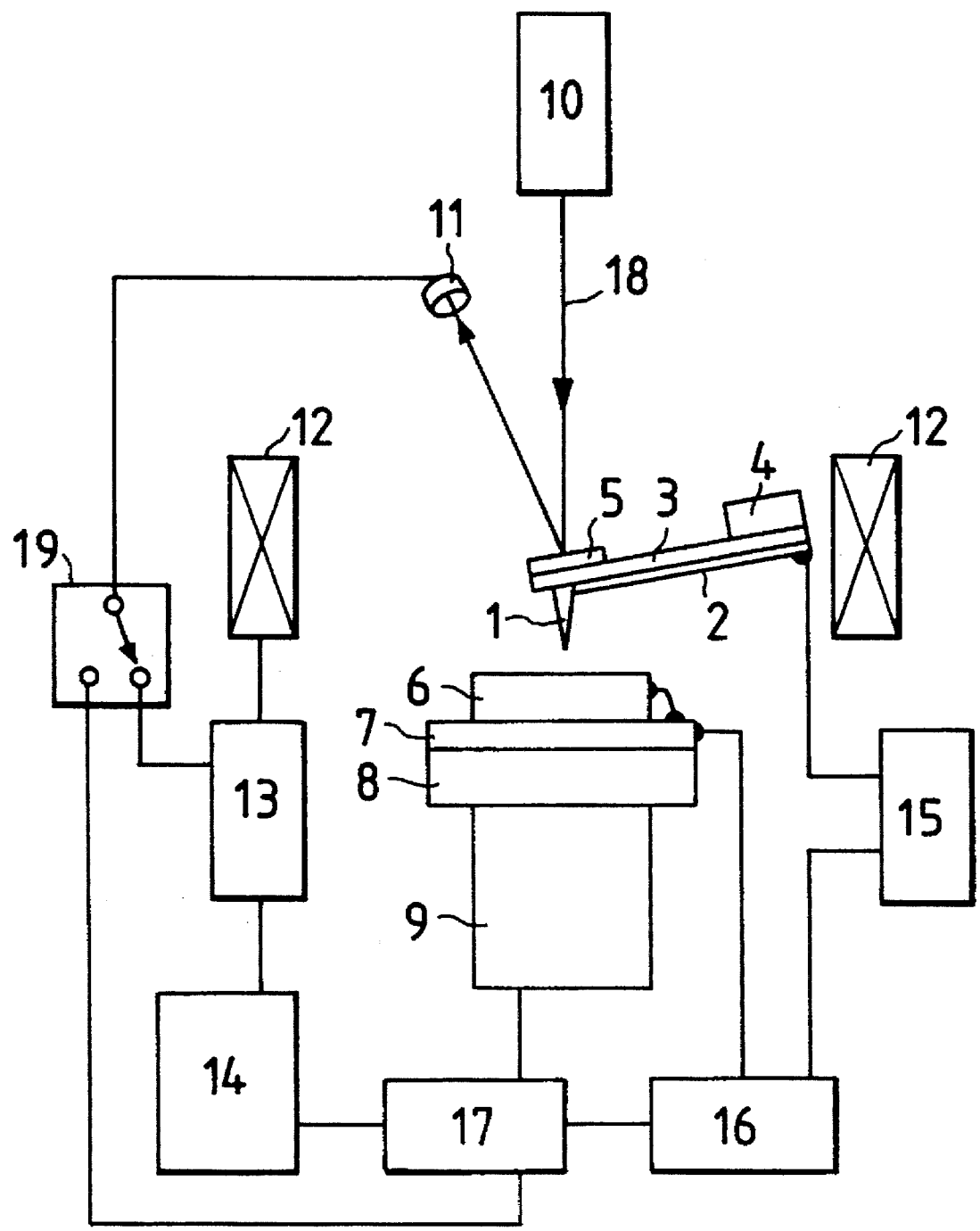
FIG. 1 is a schematic view showing a scanning probe microscope in accordance with one embodiment of the present invention.

FIG. 1 is a diagram showing the constitution of a scanning probe microscope in accordance with one embodiment of the present invention. An electrically conductive probe 1, made of platinum-indium alloy, is fixedly bonded on a distal end of a thin-film cantilever 3 made of silicon nitride which has a rectangular shape of 0.5 μm thickness, 200 μm length and 40 μm width. The probe 1 is electrically connected to a metallic thin film 2 for the detection of current flowing through the probe 1. A small magnetic thin film 5 made of nickel, with 0.1 μm thickness and 40 μm side, is formed by sputtering method on the cantilever 3 in opposed relationship with the probe 1, so that a laser beam 18 emitted from a laser source 10 is reflected by this magnetic thin film 5 for the deflection control of the cantilever 3 executed by a magnetic field generating device 12 comprising an electromagnet. A base end of the thin film cantilever 3, opposite to the distal end provided with the probe 1, is securely supported by a fixing member 4. The magnetic field generating device 12 and a later-described magnetic controller 13 constitute a deflection control mechanism.

However, the deflection control mechanism is not limited to the structure disclosed in the drawing. For example, the magnetic thin film 5 will be omitted if the probe 1 is made of a material containing magnetic substance, such as iron, nickel-cobalt or rare-earth metal. It is preferable to magnetize the magnetic material in a direction vertical to the sample surface.

A sample 6 is mounted on an electrically conductive test table 7, so that the sample 6 is electrically connected with the test table 7. A voltage generating device 15 applies voltage between the probe 1 and the sample 6 so as to generate tunneling current flowing therebetween. This tunneling current is detected by a current measuring device 16.

The electrically conductive test table 7 is fixed on an insulating test table 8. This insulating test table 8 is fixed on a three-dimensional sample drive 9 constituted by a tube-type piezoelectric member.

A small displacement measuring mechanism, constituted by the laser source 10 and a two-segmented photodiode 11, detects the deflection of the cantilever 3 by utilizing the optical lever system, in which a narrow beam from the laser source 10 is directed onto the small magnetic thin-film 5 attached on the cantilever 3 and the reflected beam is directed onto the two-segmented photodiode 11, producing a spot whose position is measured.

An output of the photodiode 11, representing a deflection amount of the cantilever 3, is transmitted to the magnetic field controller 13. The magnetic field controller 13 feedback-controls the magnetic field generating device 12 comprising a hollow core, so that the deflection amount of the cantilever 3 is adjusted to be zero or a predetermined value.

The output of the photodiode 11 (i.e. deflection amount) is also transmitted to a position controller 17 through a changeover switch 19. Based on the output of the photodiode 11, the position controller 17 controls the three-dimensional drive 9 in such a manner that the position of a sample is feedback-controlled in the vertical direction (Z direction) of the sample surface.

The position controller 17 receives information from the current measuring device 16 and actuates the three-dimensional sample drive 9 so that the sample position is feedback-controlled in the Z direction. The position controller 17 also receives information from a computer 14 and actuates the three-dimensional sample drive 9 so as to execute the raster scan over the sample surface along a plane normal to the Z direction (i.e. X and Y directions). These position controller 17 and the three-dimensional sample drive 9 constitute a position control mechanism.

The computer 14 takes in various control amounts, for example, for the deflection of the cantilever 3 and for the Z-direction position of the sample 6 with respect to numerous points on the sample surface. The computer 14 displays these input data in the form of the light and shade image or the graphic display.

This microscope can be operated in the atmosphere, however it will be preferable to place this microscope in the superhigh vacuum if the measurement obtaining detailed information of the clean sample surface is required.

First Operating Method

Hereinafter, an operating method of the microscope will be explained with reference to an example that the (110) cleavage plane of the InSb crystal is observed in the superhigh vacuum. Tellurium-doped, n-type InSb crystal is attached on the electrically conductive test table 7, and is cleaved in the superhigh vacuum to bare the (110) clean surface. Thus, a resultant InSb crystal is used as the sample 8.

The output of the photodiode 11 (i.e. deflection amount) is input into the magnetic field controller 13 through the changeover switch 19. The magnetic field controller actuates the magnetic field generating device 12 to feedback-control the deflection of the cantilever 3 in such a manner that the probe i is spaced from the sample 8 more than 10 μm. (Namely, the probe 1 is placed far away from the sample 8 so as not to cause deflection on the cantilever 3)

In this condition, the voltage generating device applies +1.0 V voltage on the sample 8. Then, the three-dimensional sample drive 9 is actuated to reduce the distance between the sample 8 and the probe i until a significant tunneling current begins flowing.

When the current measuring device 18 detects a tunneling current, the position controller 17 actuates the three-dimensional sample drive 9 and feedback-controls the sample position in the Z direction so that 0.1 nA tunneling current always flows. An attracting force is generally caused between the probe 1 and the sample 6 when the probe 1 comes so close to the sample 6 that a tunneling current begins flowing therebetween. Hence, if the deflection of the cantilever 3 is not controlled by the magnetic field generating device 12 or the like, either the probe will be apart from the sample with a distance causing no tunneling current or the probe will contact with the sample. It means that the tunneling current cannot be maintained at a constant value stably.

As described above, under the condition where the tunneling current is maintained at a constant value, the sample 6 is raster-scanned along the X-Y plane on the basis of signals from the computer 14. Thus, the computer 14 takes in the Z-directional control amounts for the three-dimensional sample drive 9 (i.e. position control mechanism) and the control amounts for the magnetic field generating device 12 (i.e. deflection control mechanism) with respect to 256× 256 points on the sample surface.

Namely, in accordance with this first operating method:

the deflection of the cantilever is maintained at a constant value by using the small displacement measuring mechanism and the deflection control mechanism;

a constant voltage is applied between the electrically conductive probe and the sample;

the sample is scanned along surface of the sample with the probe, while a tunneling current is maintained at a constant value by using the position control mechanism; and a control amount of the position control mechanism is measured in a direction vertical to the sample and a control amount of the deflection control mechanism is also measured.

Figure 2:
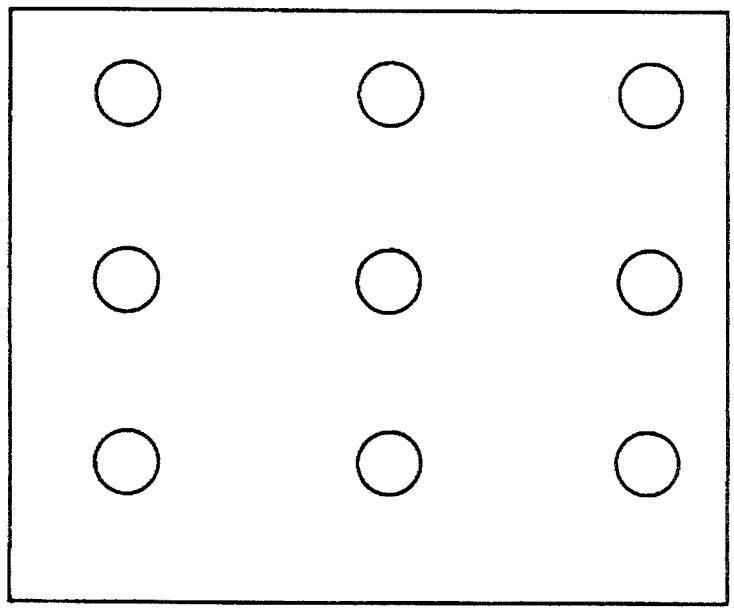
FIG. 2 is a view showing one example of atomic arrangement, obtained based on Z-directional control amounts of the three-dimensional sample drive.
Figure 3:
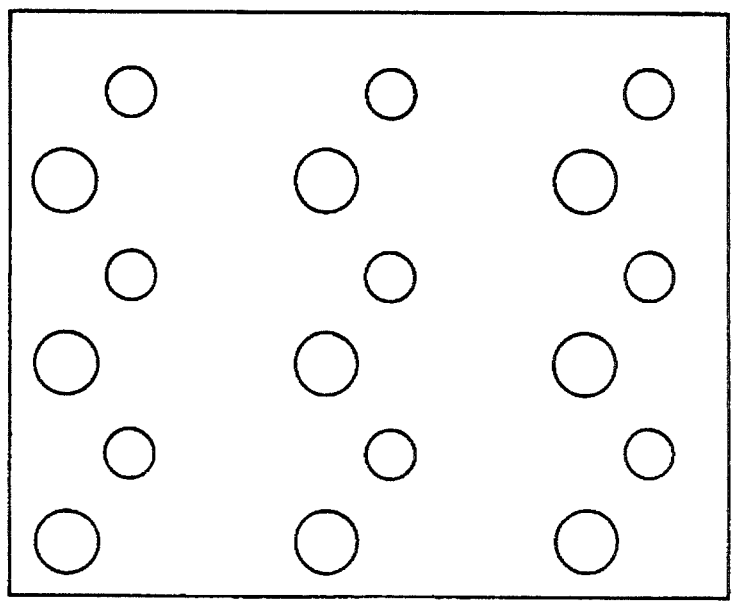
FIG. 3 is a view showing another example of atomic arrangement, obtained based on control amounts of the magnetic field generating device.

FIGS. 2 and 3 are views schematically showing light and shade images obtained based on the Z-directional control amounts for the three-dimensional sample drive 9 and the control amounts for the magnetic field generating device 12, which are alternately detected at respective measuring points.

In FIG. 2, areas indicated by a round mark represent the region where the probe 1 is largely apart from the sample 6 —namely, the areas where the tunneling current flows easily—, corresponding to In atomic arrangement.

In FIG. 3, areas indicated by a large round mark represent the region where the magnetic field generating device 12 generates a greater magnetic field in the direction that the probe 1 is spaced far away from the sample 6 to control the deflection of the cantilever 3—namely, the areas where a large attraction force is generated between the probe 1 and the sample 6. And, areas indicated by a small round mark represent the region where a slightly larger attraction force is generated.

If the views of FIGS. 2 and 3 are superimposed one another, it will be found that the round marks on FIG. 2 exactly coincide with the small round marks on FIG. 3. That is, these marks represent In atoms.

Accordingly, the large round marks of FIG. 3 correspond to Ga atoms.

The atomic arrangement in these drawing has a period of 6.5 Å in the lateral direction and 4.6 Å in the longitudinal direction. This assures that the atomic arrangement is observed successfully.

When the voltage applied to the sample 6 is reduced to—1 V, only Sb atomic arrangement is observed from the image obtained based on the Z-directional control amounts of the three-dimensional sample drive 9. Meanwhile, both In atomic arrangement and Sb atomic arrangement are observed from the image obtained based on the control amounts of the magnetic field generating device 12, more clearly than the case where a positive voltage is applied on the sample 6.

As apparent from the foregoing description, the microscope of the present invention is superior to the conventional STM which only displays either of In atoms and Sb atoms depending on the polarity of the applied voltage. That is, the present invention microscope displays both of In and Sb atoms, which means that the atomic species can be identified by the comparison with the data of the STM.

Second Operating Method

Furthermore, another operating method of the microscope of the present invention will be explained hereinafter.

The output of the photodiode 11 (deflection amount) is input into the magnetic field controller 13 through the changeover switch 19. The magnetic field controller 13 actuates the magnetic field generating device 12 to feedback-control the deflection of the cantilever 3 in such a manner that the probe 1 is spaced from the sample 6 more than 10 μm. (Namely, the probe 1 is placed far away from the sample 6 so as not to cause deflection on the cantilever 3)

In this condition, the voltage generating device 15 applies +1.0 V voltage on the sample 6. Then, the three-dimensional drive 9 is actuated to reduce the distance between the sample 6 and the probe 1 until a significant tunneling current begins flowing.

When the current measuring device 16 detects a tunneling current, the position controller 17 actuates the three-dimensional sample drive 9 and feedback-controls the sample position in the Z direction to keep the tunneling current at 0.1 nA.

Thereafter, under the condition where the feedback control along the Z direction is interrupted, the position controller 17 raster-scans the sample 6 along the X-Y plane on the basis of signals from the computer 14. Thus, the computer 14 takes in the tunneling current values detected by the current measuring device 16 and the control amounts for the magnetic field generating device 12 (i.e. deflection control mechanism) with respect to 256×256 points on the sample surface.

Namely, in accordance with this second operating method:

deflection of the cantilever is maintained at a constant value by using the small displacement measuring mechanism and the deflection control mechanism;

a constant voltage is applied between the electrically conductive probe and the sample to cause tunneling current;

the sample is scanned along surface of the sample with the probe, using the position control mechanism; and an amount of the tunneling current and a control amount of the deflection control mechanism are measured.

With such an operation, the tunneling current image similar to FIG. 2 is obtained and the image of force received by the cantilever 3 was substantially the same as FIG. 3.

Third Operating Method

Still another operating method of the microscope of the present invention will be explained.

The output of the photodiode 11 (deflection amount) is input to the position controller 17, not to the magnetic field controller 13, through the changeover switch 19. Subsequently, the magnetic field generating device 12 controls the deflection of the cantilever 3 in such a manner that the laser beam 18 from the laser source 10 is directed to the center of the 2-segmented photodiode 11. Namely, the output of the small displacement measuring mechanism is optimized.

Under such an optimized condition, the position controller 17 actuates the three-dimensional sample drive 9 and feedback-controls the Z-directional position of the sample 6 so that a photodiode output obtained is always constant. Namely, the deflection amount of the cantilever is maintained at a constant value by the small displacement measuring mechanism and the position control mechanism. The voltage generating device 15 applies voltage on the sample 6, and the current measuring device 16 detects a resultant current.

Thereafter, the position controller 17 raster-scans the sample 6 along the X-Y plane based on signals from the computer 14. Thus, the computer 14 takes in the current values detected by the current measuring device 16 and the control amounts for the three-dimensional sample drive 9 (i.e. position control mechanism) with respect to 256×256 points on the sample surface.

Namely, in accordance with this third operating method:
deflection of the cantilever is maintained at a constant value by using the small displacement measuring mechanism and the position control mechanism, after controlling the deflection of the cantilever by the deflection control mechanism to optimize an output of the small displacement measuring mechanism;

a constant voltage is applied between the electrically conductive probe and the sample to cause current;

the sample is scanned along surface of the sample with the probe, using the position control mechanism; and an amount of the current and a control amount of the position control mechanism are measured.

Using image processing technologies, the surface roughness images (AFM images) and the surface conductivity distribution images are obtained with remarkably high resolution.

Fourth Operating Method

Although, in the above-described third operating method, the sample position is feedback-controlled along the Z direction so that a constant force is applied from the sample 6 to the probe 1, the AFM images with high resolution are also obtained even if the output of the photodiode 11 (i.e. deflection amount) is directly input into the computer 14 without executing the feedback control of the position control mechanism.

Namely, in accordance with this fourth operating method:

a deflection amount of the cantilever is measured by using the small displacement measuring mechanism, after controlling the deflection of the cantilever by the deflection control mechanism to optimize an output of the small displacement measuring mechanism;

a constant voltage is applied between the electrically conductive probe and the sample to cause current;

the sample is scanned along surface of the sample with the probe, using the position control mechanism; and an amount of the current and deflection amount are measured.

Fifth Operating Method

Moreover, yet another operating method of the microscope of the present invention will be explained.

Figure 4:
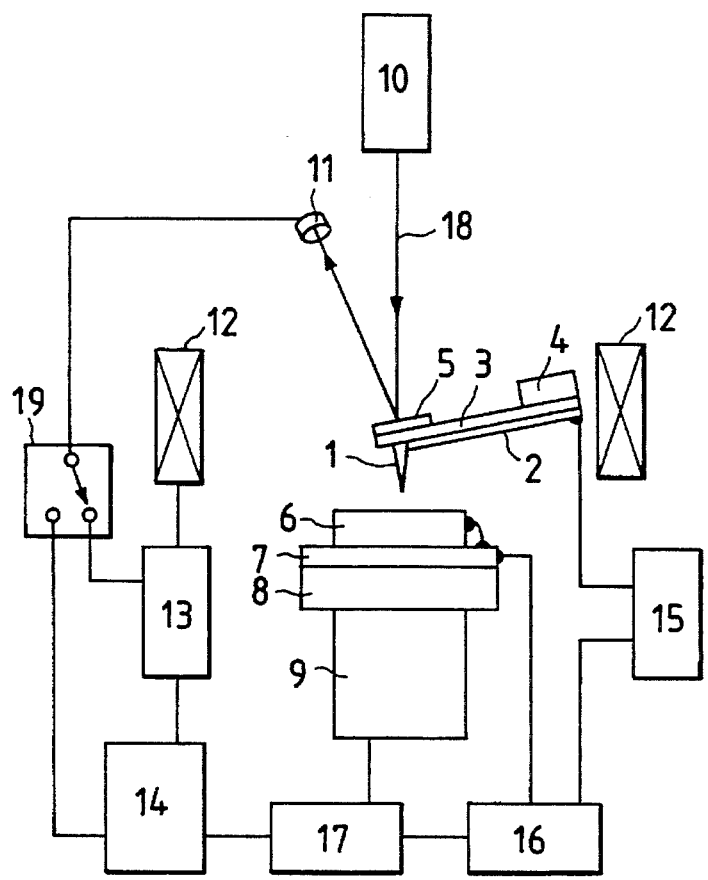
FIG. 4 is a schematic view showing a scanning probe microscope in accordance with another embodiment of the present invention.

This operating method uses the scanning probe microscope shown in FIG. 4, which is different from that of FIG. 1 in that one of bifurcated output terminals of the changeover switch 19 is connected to the computer 14, not to the position controller 17. The output of the photodiode 11 (deflection amount) is input into the computer 14 through the changeover switch 19. The voltage generating device 15 applies several volts between the sample 6 and the probe 1. The distance between the sample 6 and the probe 1 is reduced until a tunneling current begins flowing. When the tunnel current is detected, the magnetic field controller 1B actuates the magnetic field generating device 12 and feedback-controls the deflection of the cantilever 3 in such a manner that 0.1 nA tunneling current always flows.

Under this condition, the position controller 17 raster-scans the sample 8 along the X-Y plane based on signals from the computer 14. Thus, the computer 14 takes in the outputs of the photodiode 11 (i.e. deflection amount) and the control amounts for the magnetic generating device 12 (i.e. deflection control mechanism) with respect to 258×258 points on the sample surface.

Namely, in accordance with this fifth operating method:
the probe and the sample are brought into closer relationship under a condition where voltage is applied between the probe and the sample;

a tunneling current flowing between the probe and the sample is maintained at a constant value by the deflection control mechanism;

the sample is scanned along surface of the sample with the probe, using the position control mechanism; and a control amount of the deflection control mechanism and a deflection amount of the cantilever detected by the small displacement measuring mechanism are measured.

Such a measurement enables to compare the output of the photodiode 11 with the control amount for the magnetic field generating device 12. Therefore, in the measurement of a sample containing electrically non-conductive region where no tunneling current flows, the electrically non-conductive region can be discriminated from the electrically conductive region by comparing the difference of the output of the photodiode 11 and the control amount for the magnetic field generating device 12, without bringing the probe 1 into contact with the sample 6. Furthermore, it becomes possible to measure the STM image in the electrically conductive region. Even if the probe 1 is brought into contact with the sample 6, the fine tip of the probe 1 can be prevented from being damaged when the cantilever 3 has a small spring constant of approximately 0.01N/m.

Various Modifications

The above embodiments show the optical lever system comprising the semiconductor laser and the photodiode which serve as the small displacement measuring mechanism. However, the deflection of the cantilever can be detected with high sensitivity by forming a piezoelectric thin film with electrodes on both surfaces thereof on the thin-film cantilever so as to detect an output voltage of the piezoelectric thin film.

The films such as zinc oxide or thin films with perovskite structure are preferably used as the piezoelectric thin film.

This kind of the piezoelectric thin film is also effective when used as the deflection control mechanism. Namely, applying voltage on the piezoelectric thin film can cause deflection on the cantilever.

Furthermore, it is possible to form on the thin film cantilever the laminated thin-film layers of electrode/piezoelectric thin film/electrode/piezoelectric thin film/electrode. Using the central electrode as a common electrode, this laminated thin-film layers can function as a deflection control mechanism by applying voltage to one of upper and lower electrode and also can function as a small displacement measuring mechanism by measuring the output voltage of the other electrode.

Still further, it is possible to form the cantilever itself by piezoelectric thin film with electrodes appropriately provided thereon, so as to function as a small displacement measuring mechanism and/or a deflection control mechanism.

Figure 5:
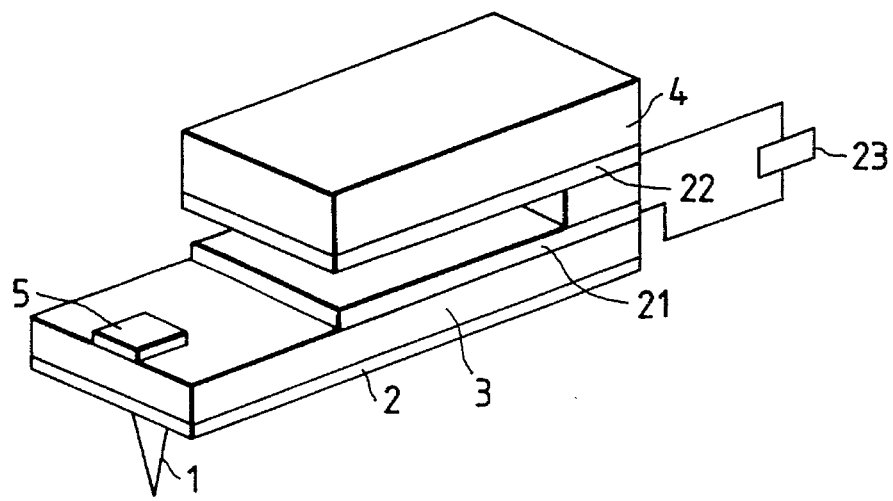
FIG. 5 is a schematic view showing a cantilever incorporated in a deflection control mechanism or a small displacement measuring mechanism in accordance with one embodiment of the present invention.

Yet further, to form a capacitor, an electrode 21 is formed partly on the cantilever and a facing electrode 22 is disposed to confront with the electrode 21 as shown in FIG. 5. An electric power source 23 applies voltage between these two electrodes to generate electrostatic force, thus causing deflection of the cantilever 3 to constitute the deflection control mechanism. Moreover, this control mechanism can function as a small displacement measuring mechanism by measuring electrostatic capacitance between these two electrodes.

Although above embodiments are explained based on the sample made of InSb, it is possible to apply the present invention to identify other samples, such as other III-V group compound semiconductor, hydrogen or oxygen atoms adsorbed on Si or Ge substrate.

Furthermore, a probe made of magnetic material will make it possible to identify the atom having magnetism.

As described in the foregoing description, the present invention provides a scanning probe microscope, equipped with an active cantilever whose deflection amount is flexibly controlled, with high functions combining the atomic force microscope and the scanning tunneling microscope. By using this novel microscope, detailed electric and mechanical information corresponding to respective atoms are obtained with high sensitivity, enabling the judgement of the atomic species and preventing the fine tip of the probe from being damaged by collision with the sample which was a large problem for the conventional STM, thus bringing large practical merits.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A scanning probe microscope comprising:

a cantilever having a distal end equipped with an electrically conductive probe, said electrically conductive probe allowing current to flow and having a fine tip whose voltage is controllable;

a position control mechanism for controlling position of a sample with respect to a base end of said cantilever;

a small displacement measuring mechanism for measuring a deflection amount of said cantilever; and a deflection control mechanism, independent of said position control mechanism, for maintaining deflection of said cantilever at a constant value using an output of said small displacement measuring mechanism.

2. A scanning probe microscope in accordance with claim 1, wherein said small displacement measuring mechanism is constituted by an optical lever system including a light source and an optical detector.

3. A scanning probe microscope in accordance with claim 1, wherein at least either of said small displacement measuring mechanism and said deflection control mechanism comprises a magnetic thin film provided on said cantilever.

4. A scanning probe microscope comprising:

a cantilever having a distal end equipped with an electrically conductive probe, said electrically conductive probe allowing current to flow and having a fine tip whose voltage is controllable;

a position control mechanism for controlling position of a sample with respect to a base end of said cantilever;

a small displacement measuring mechanism for measuring a deflection amount of said cantilever; and a deflection control mechanism for maintaining deflection of said cantilever at a constant value using an output of said small displacement measuring mechanism, wherein said cantilever is provided with a piezoelectric member which is incorporated in at least either of said small displacement measuring mechanism and said deflection control mechanism.

5. A scanning probe microscope comprising:

a cantilever having a distal end equipped with an electrically conductive probe, said electrically conductive probe allowing current to flow and having a fine tip whose voltage is controllable;

a position control mechanism for controlling position of a sample with respect to a base end of said cantilever;

a small displacement measuring mechanism for measuring a deflection amount of said cantilever; and a deflection control mechanism for maintaining deflection of said cantilever at a constant value using an output of said small displacement measuring mechanism, wherein said cantilever is formed by a piezoelectric thin film, and said cantilever is incorporated in at least either of said small displacement measuring mechanism and said deflection control mechanism.

6. A scanning probe microscope comprising:

a cantilever having a distal end equipped with an electrically conductive probe, said electrically conductive probe allowing current to flow and having a fine tip whose voltage is controllable;

a position control mechanism for controlling position of a sample with respect to a base end of said cantilever;

a small displacement measuring mechanism for measuring a deflection amount of said cantilever; and a deflection control mechanism for maintaining deflection of said cantilever at a constant value using an output of said small displacement measuring mechanism, wherein said deflection control mechanism is constituted by said cantilever and a magnetic field generating apparatus which generates magnetic field in the vicinity of said cantilever.

7. A scanning probe microscope in accordance with claim 6, wherein said deflection control mechanism includes a magnetic member interactive with said magnetic field generating apparatus.

8. A scanning probe microscope comprising:

a cantilever having a distal end equipped with an electrically conductive probe, said electrically conductive probe allowing current to flow and having a fine tip whose voltage is controllable;

a position control mechanism for controlling position of a sample with respect to a base end of said cantilever;

a small displacement measuring mechanism for measuring a deflection amount of said cantilever; and a deflection control mechanism for maintaining deflection of said cantilever at a constant value using an output of said small displacement measuring mechanism, wherein said deflection control mechanism includes an electrode provided on said cantilever at least partly, a facing electrode disposed to confront with said electrode, and an electric power source applying voltage between said electrode and said facing electrode.

9. A scanning probe microscope comprising: a cantilever having a distal end equipped with an electrically conductive probe, said electrically conductive probe allowing current to flow and having a fine tip whose voltage is controllable;

a position control mechanism for controlling position of a sample with respect to a base end of said cantilever;

a small displacement measuring mechanism for measuring a deflection amount of said cantilever;

a deflection control mechanism for maintaining deflection of said cantilever at a constant value using an output of said small displacement measuring mechanism and a switch for selectively supplying an output of said small displacement measuring mechanism to said position control mechanism or to said deflection control mechanism.

10. A scanning probe microscope in accordance with claim 9, wherein said position control mechanism comprises a three-dimensional drive for moving the sample and a position controller for receiving the output of said small displacement measuring mechanism and actuating said three-dimensional drive.

11. A scanning probe microscope in accordance with claim 9, wherein said small displacement measuring mechanism comprises a light source and an optical detector.

12. A scanning probe microscope in accordance with claim 9, wherein said deflection control mechanism comprises a magnetic generating device for generating magnetic field in the vicinity of said cantilever and a magnetic field controller for receiving the output of said small displacement measuring mechanism and actuating said magnetic field generating device.

13. A scanning probe microscope in accordance with claim 9, further comprising a computer connected to both of said position control mechanism and said deflection control mechanism.

14. A method for measuring surfaces by using a microscope comprising a cantilever having a distal end equipped with an electrically conductive probe allowing current to flow and having a fine tip whose voltage is controllable, a position control mechanism for controlling position of a sample with respect to a base end of said cantilever, a small displacement measuring mechanism for measuring a deflection amount of said cantilever, and a deflection control mechanism for controlling deflection of said cantilever so as to adjust a distance between said fine tip of said probe and said sample, said method comprising steps of:

maintaining deflection of said cantilever at a constant value by using said small displacement measuring mechanism and said deflection control mechanism;

applying a constant voltage between said electrically conductive probe and said sample;

scanning said sample along surface of said sample with said probe, while a tunneling current is maintained at a constant value by using said position control mechanism; and measuring a control amount of said position control mechanism in a direction vertical to said sample and a control amount of said deflection control mechanism.

15. A method for measuring surfaces in accordance with claim 14, wherein said sample is scanned with said probe under a condition where an attraction force is caused between said probe and said sample.

16. A method for measuring surfaces by using a microscope comprising a cantilever having a distal end equipped with an electrically conductive probe allowing current to flow and having a fine tip whose voltage is controllable, a position control mechanism for controlling position of a sample with respect to a base end of said cantilever, a small displacement measuring mechanism for measuring a deflection amount of said cantilever, and a deflection control mechanism for controlling deflection of said cantilever so as to adjust a distance between said fine tip of said probe and said sample at a desired value, said method comprising steps of:

maintaining deflection of said cantilever at a constant value by using said small displacement measuring mechanism and said deflection control mechanism;

applying a constant voltage between said electrically conductive probe and said sample to cause tunneling current;

scanning said sample along surface of said sample with said probe, using said position control mechanism; and measuring an amount of said tunneling current and a control amount of said deflection control mechanism.

17. A method for measuring surfaces in accordance with claim 16, wherein said sample is scanned with said probe under a condition where an attraction force is caused between said probe and said sample.

18. A method for measuring surfaces by using a microscope comprising a cantilever having a distal end equipped with an electrically conductive probe allowing current to flow and having a fine tip whose voltage is controllable, a position control mechanism for controlling position of a sample with respect to a base end of said cantilever, a small displacement measuring mechanism for measuring a deflection amount of said cantilever, and a deflection control mechanism for controlling deflection of said cantilever so as to adjust a distance between said fine tip of said probe and said sample at a desired value, said method comprising steps of:

maintaining deflection of said cantilever at a constant value by using said small displacement measuring mechanism and said position control mechanism, after controlling the deflection of said cantilever by said deflection control mechanism to optimize an output of said small displacement measuring mechanism;

applying a constant voltage between said electrically conductive probe and said sample to cause current;

scanning said sample along surface of said sample with said probe, using said position control mechanism; and measuring an amount of said current and a control amount of said position control mechanism.

19. A method for measuring surfaces by using a microscope comprising a cantilever having a distal end equipped with an electrically conductive probe allowing current to flow and having a fine tip whose voltage is controllable, a position control mechanism for controlling position of a sample with respect to a base end of said cantilever, a small displacement measuring mechanism for measuring a deflection amount of said cantilever, and a deflection control mechanism for controlling deflection of said cantilever so as to adjust a distance between said find tip of said probe and said sample at a desired value, said method comprising steps of:

measuring a deflection amount of said cantilever by using said small displacement measuring mechanism, after controlling the deflection of said cantilever by said deflection control mechanism to optimize an output of said small displacement measuring mechanism;

applying a constant voltage between said electrically conductive probe and said sample to cause current;

scanning said sample along surface of said sample with said probe, using said position control mechanism; and measuring an amount of said current in relation to said deflection amount.

20. A method for measuring surfaces by using a microscope comprising a cantilever having a distal end equipped with an electrically conductive probe allowing current to flow and having a fine tip whose voltage is controllable, a position control mechanism for controlling position of a sample with respect to a base end of said cantilever, a small displacement measuring mechanism for measuring a deflection amount of said cantilever, and a deflection control mechanism for controlling deflection of said cantilever so as to adjust a distance between said fine tip of said probe and said sample at a desired value, said method comprising steps of:

advancing said probe toward said sample under a condition where voltage is applied between said probe and said sample;

maintaining a tunneling current flowing between said probe and said sample at a constant value by said deflection control mechanism;

scanning said sample along surface of said sample with said probe, using said position control mechanism; and measuring a control amount of said deflection control mechanism and a deflection amount of said cantilever detected by said small displacement measuring mechanism.

21. A method for measuring surfaces in accordance with claim 20, wherein said sample is scanned with said probe under a condition where an attraction force is caused between said probe and said sample.

\* \* \* \* \*